United States Patent [19]

Morris

[11] Patent Number: 4,601,601
[45] Date of Patent: Jul. 22, 1986

[54] ROTARY ANTI-BACKLASH COMPONENT

[75] Inventor: Norman Morris, Buckingham, England

[73] Assignee: Leslie Hartridge Limited, Buckingham, England

[21] Appl. No.: 628,956

[22] Filed: Jul. 6, 1984

[30] Foreign Application Priority Data

Jul. 20, 1983 [GB] United Kingdom ............... 8319622

[51] Int. Cl.$^4$ ............................ B25G 3/28; F16B 3/00
[52] U.S. Cl. ........................................ 403/359; 74/409
[58] Field of Search .......................... 403/359; 74/409

[56] References Cited

U.S. PATENT DOCUMENTS 2,737,056  3/1956  Baumgartner ...................... 74/409
3,373,625  3/1968  Keller ............................. 403/359 X
3,742,778  7/1973  Sedlak ............................. 74/409 X
4,421,496 12/1983  Emerson et al. ...................... 464/95

Primary Examiner—Andrew V. Kundrat
Attorney, Agent, or Firm—Berman, Aisenberg & Platt

[57] ABSTRACT

An internally splined rotary anti-backlash component is adapted to engage an externally splined injection-pump shaft end. Fixing pins extend radially through the component and have wedge-shaped ends which protrude into gaps between the splines of the shaft end. This inhibits backlash between the component and the shaft end for a predetermined sense of rotation of the component relative to itself. The component can be disengaged from the shaft end, turned around back-to-front, and re-engaged, to allow the sense of drive to be reversed.

10 Claims, 4 Drawing Figures

ROTARY ANTI-BACKLASH COMPONENT

The present invention relates to a rotary anti-backlash component, especially but not exclusively an anti-backlash splined drive for use in connecting an electric drive motor or other prime mover to a pump of a fuel injection test machine via an anti-backlash coupling.

U.S. Pat. No. 4,421,496 describes and claims a drive coupling for connecting such a motor to such a pump with torsional rigidity even though the rotary axes of the motor and the pump may be out of alignment with one another. The manner in which the coupling is connected to the pump shaft is such as to avoid backlash between those two components.

In addition to the provision of anti-backlash means in the coupling itself a further anti-backlash device (not described in that earlier patent of ours) may be used to connect the coupling to the pump shaft. This comprises an internally splined drive cup extending from the anti-backlash coupling and engaging an externally splined driven shaft extending from the pump. Three bores extend through the cup, radially inwardly from an outer surface thereof through to its interior. These bores are in register with respective internal splines of the cup so that the inner ends of the bores open into the cup interior through these splines. Three fixing pins are contained respectively within these bores. They have tapered inner ends protruding slightly beyond their associated splines. Consequently they each form a wedge in a respective groove between two splines of the externally splined shaft. This prevents any slight relative rotational movement between the shaft and cup that may otherwise have been possible owing to manufacturing and assembling tolerances.

Figure 1:
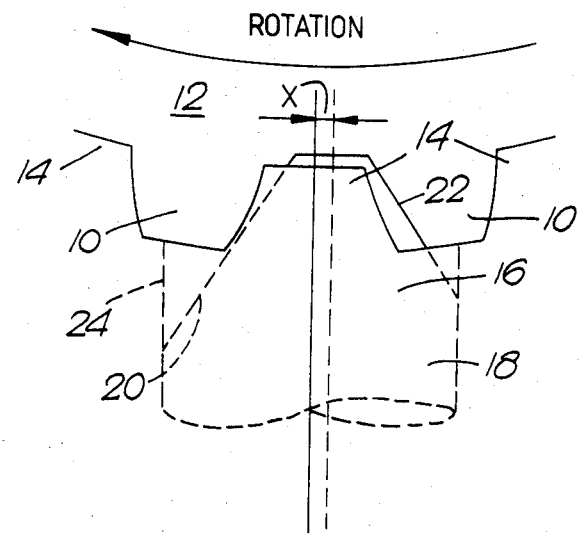
FIG. 1 is a schematic view of details of the fixing pin and splined shaft.
Figure 2:
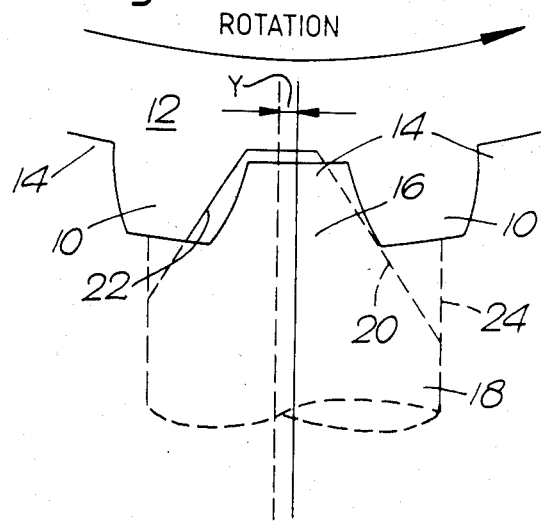
FIG. 2 is a schematic view of details of the fixing pin and splined shaft with the direction of shaft rotation reversed.

Details of a fixing pin and the splined shaft are shown in FIGS. 1 and 2. These each show splines 10 (only two of which are shown in each Figure) on a shaft 12, grooves 14 being defined between each pair of adjacent splines 10. The internal end 16 of each fixing pin 18 is tapered so that it has two flasks 20 and 22. This tapering has a central plane which is offset from the longitudinal axis of the pin. As a result the flank 20 is longer than the flank 22.

As viewed in FIG. 1 the sense of rotation of the shaft 12 is clockwise. The pin is therefore arranged with its longer flank 20 facing in a clockwise direction so that the central plane of the wedge is offset from the axis of the pin in an anti-clockwise direction. Since the pin 18 and its associated bore 24 are in register with a particular spline of the cup (not shown in FIG. 1 or 2) the tapered end 16 is so wedged in a groove 14 between two splines 10 of the shaft 12 that the latter is shifted slightly in an anti-clockwise direction, relative to the cup, as far as tolerances between the splines of the cup and the shaft will allow. This means that the leading faces of the driving cup splines are in immediate contact with the trailing faces of the driven shaft splines. Therefore, a full driving torque exerted by the cup on the shaft is taken up by all the splines.

In FIG. 2, in which the shaft 12 is driven in an anti-clockwise sense, the central plane of the wedge is offset from the axis of fixing pin 18 in a clock-wise direction, again to ensure that the driving torque exerted by the cup on the shaft is borne by the splines. The same fixing pins 18 can be used if they are each rotated by 180 degrees about their respective axes. This has hitherto been achieved by removing the cup from the drive assembly, taking various components of the drive cup apart, reversing the fixing pins, and putting the whole drive assembly back together again. This is very time consuming, especially if the direction of drive is to be reversed during a particular sequence of operations.

The present invention seeks to reduce the time required to reverse the drive direction.

Accordingly, in the present invention, a drive component which carries the fixing pins or other corresponding members is reversible to effect the 180 degree turn of the fixing members without removal of the latter from the component.

In one form, the present invention provides a rotary anti-backlash component having attachment means for attaching the component to drive or driven means, and fixing members having ends which define an intended sense of rotation of the component and which project into grooves of a splined member when the component is in use, in which the attachment means are so constructed as to enable the component to be turned around back-to-front to allow the sense of drive to be reversed.

Figure 3:
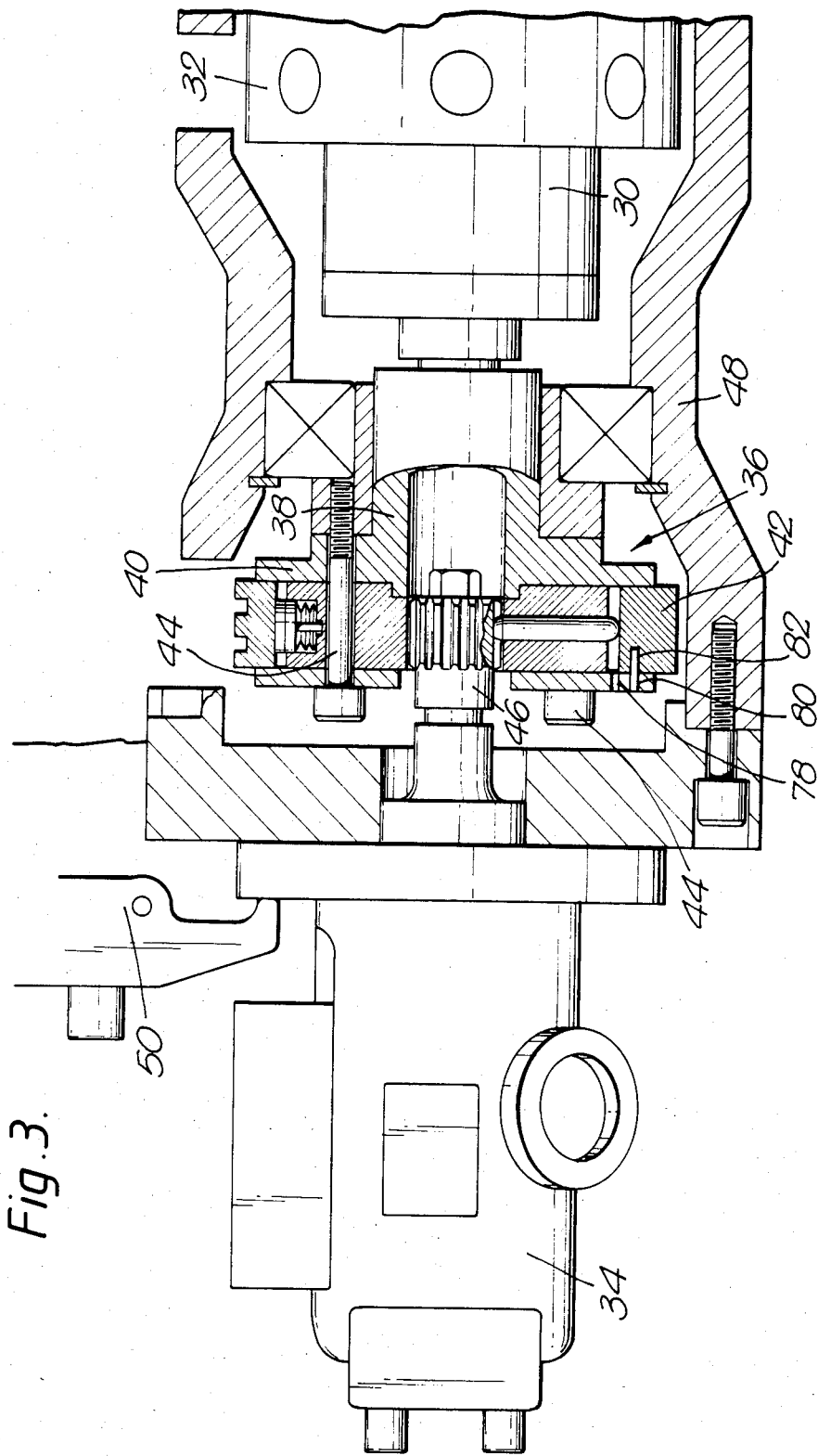
FIG. 3 is an axial sectional view of a drive connecting assembly which incorporates such a component.
Figure 4:
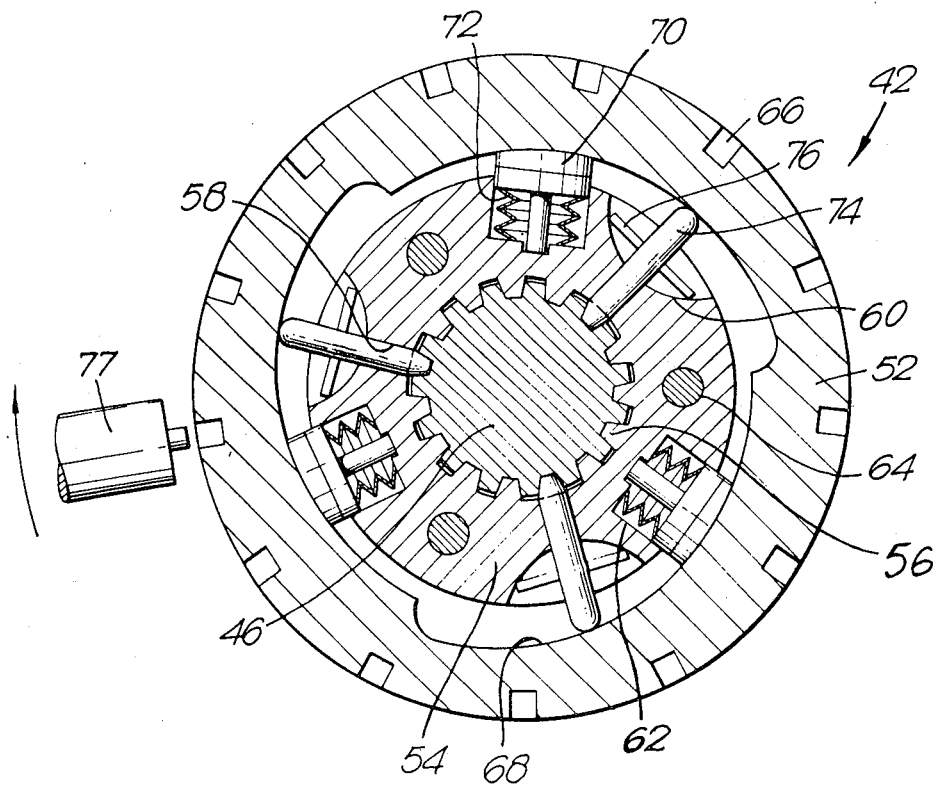
FIG. 4 is a cross-sectional view of the component.

An example of a component made in accordance with the present invention is illustrated in FIGS. 3 and 4 of the accompanying diagrammatic drawings, in which:

In FIG. 3, the output side 30 of an anti-backlash coupling 32 is connected to a pump 34 via an anti-backlash splined drive 36. The latter comprises an attachment cup 38 secured to the output side 30 of the coupling 32 and is provided with a flange 40 to which the anti-backlash drive component 42 is fixed by bolts 44. The anti-backlash drive component 42 is in the form of a ring or annulus which is internally splined and which engages an externally splined shaft 46 of the pump 34. Also shown in FIG. 3 are a drive housing 48 and a clamp 50 which holds the pump 34 against axial displacement from the splined drive 42.

FIG. 4 shows details of the drive component 42. It comprises outer and inner concentric rings 52 and 54. The inner ring 54 is formed with splines 56 around its inner periphery, and three equi-angularly spaced radially extending bores 58 each in register with a respective spline 56 and opening on the outer periphery of the inner ring 54 into shallow recesses 60. The inner ring is further formed with three deep cylindrically-shaped recesses 62 extending inwardly from the outer periphery of the inner ring 54, and axially extending fixing bores 64. The outer ring 52 is formed around its outer periphery with pairs of recesses 66 (only one of each pair being evident from FIG. 4) and gently sloping ramp or cam faces 68 on its inside periphery. There are three such faces 68 spaced apart equi-angularly around the outer ring 52 and corresponding generally in position with the radially extending bores 58 in the ring 54.

Friction pads 70 are accommodated by the deep recesses 62 and are urged outwardly against the inside periphery of the outer ring 52 by compression springs 72. Respective fixing pins 74 extend through the axially extending bores 58 of the inner ring 54. These fixing pins have inner ends as shown in FIGS. 1 and 2 and engage the splined shaft 46 of the pump 34 (not shown in FIG. 4) in the same way as described and illustrated with reference to FIGS. 1 and 2. Towards their outer ends, the pins 74 are provided with outwardly projecting spring wires 76. The outer ends of these wires 76 abut the shallow recesses 60 and oppose any force acting on the pins which urges them inwardly. If the outer ring 52 is rotated in a clockwise sense in relation to the inner ring 54 by means of a tool 77 engaging the pairs of recesses 66, the ramps or cam surfaces 68 act on the outer face of the fixing pins 74 to drive them inwardly and wedge their inner ends in the shaft grooves in the manner described with reference to FIGS. 1 and 2. A keeper plate 78 (shown in FIG. 3) with slots 80 may be provided on the ring 54 so that its slots engage lugs 82 on the outer ring 52 to prevent over-rotation of the outer ring 52. The friction pads 70 prevent any relative slipping between the inner and outer rings 52 and 54 which would slacken the wedging action of the fixing pins.

If the drive direction is to be reversed, the tool 77 is used to rotate the outer ring 52 in an anticlockwise direction relative to the inner ring 54 as viewed in FIG. 4 so as to loosen the fixing pins 74. Also the clamp 50 is released to allow the pump shaft 46 to be slid out of engagement with the anti-backlash component 42. The bolts 44 may now be removed and the whole component 42 flipped over and re-attached back-to-front to the flange 40 of the attachment cup 38 by means of the bolts 44. The splined shaft 46 of the pump 34 is then slid back into engagement with the component 42, the clamp 50 re-positioned and the fixing pins 74 tightened up again. The drive assembly is now ready to rotate the pump shaft in the reverse direction.

This procedure does not involve taking apart the drive component 42 to rotate each individual fixing pin 74 about its own longitudinal axis, as was necessary hitherto. Reversing drive direction is thereby rendered less time consuming.

Numerous variations and modifications to the component 42 will readily occur to the reader familiar with the art of drive connections without taking it outside the scope of the present invention. For example, the component 42 may be one which is driven rather than one which drives. It would also be conceivable to design the component as an externally splined component so that the wedging ends of the fixing pins project outwardly from an outer periphery of the component and into grooves of an internally splined annular member.

I claim:

1. A rotary anti-backlash component adapted to engage a rotary drive component so that rotation of one of the components causes rotation of the other, the anti-backlash component comprising: (a) an engagement member; (b) faces of said engagement member which, when the latter is in use, abut faces of such a rotary drive component to effect a driving engagement between said two components; (c) at least one fixing part of said anti-backlash component which engages said engagement member, and which also engages such a drive component when the anti-backlash component is in use to inhibit backlash between said two components for a predetermined sense of rotation of said anti-backlash component relative to itself; (d) a first engagement side of said anti-backlash component which faces the direction of movement of said anti-backlash component as the latter is brought into engagement with such a drive member for rotation thereof in one sense of drive; and (e) a second engagement side of said anti-backlash component, which is on the other side thereof to said first engagement side, whereby said anti-backlash component is so constructed that it can be disengaged from such a drive component, turned around back-to-front and re-engaged, to allow the sense of drive to be reversed.

2. An anti-backlash component according to claim 1, in which said at least one fixing part comprises a fixing pin having a tapered end, in which the tapering is offset from the longitudinal axis of said pin, and in which the tapered end engages a splined drive component, between two splines thereof, when said anti-backlash component is in use.

3. An anti-backlash component according to claim 1, in which said engagement member is ring shaped.

4. An anti-backlash component according to claim 1, in which said engagement member is internally splined to engage an externally splined drive component.

5. An anti-backlash component according to claim 1, in which said at least one fixing part is moveable and in which said anti-backlash component is provided with at least one moveable cam surface which acts on said fixing part to tighten the engagement between the anti-backlash component and such a drive component.

6. An anti-backlash component according to claim 1, comprising two concentric rings, the inner of which constitutes said engagement member, in which relative rotation between said rings tightens the engagement between the anti-backlash component and such a drive component.

7. An anti-backlash component according to claim 6, which is provided with at least one friction member to inhibit relative rotation between said rings which would loosen the engagement between said anti-backlash component and such a drive component.

8. An anti-backlash component according to claim 6, in which recesses are provided around the periphery of the outer ring to assist in rotating said outer ring relative to said inner ring.

9. An anti-backlash component according to claim 1, in which said at least one fixing part is moveable and is provided with a return spring to urge said fixing part in a direction out of engagement with such a drive component.

10. A rotary anti-backlash assembly comprising a first rotary drive component to which a rotary anti-backlash component as claimed in claim 1 is attached, and a second rotary drive component which the anti-backlash component engages.

* * * * *